(12) United States Patent
Miller

(10) Patent No.: US 6,261,534 B1
(45) Date of Patent: Jul. 17, 2001

(54) METHOD FOR MAKING ZSM-5 ZEOLITES

(75) Inventor: Stephen J. Miller, San Francisco, CA (US)

(73) Assignee: Chevron U.S.A. Inc., San Francisco, CA (US)

( * ) Notice: Subject to any disclaimer, the term of this patent is extended or adjusted under 35 U.S.C. 154(b) by 0 days.

(21) Appl. No.: 09/449,191

(22) Filed: Nov. 24, 1999

(51) Int. Cl.⁷ ..................................... C01B 39/38
(52) U.S. Cl. ................ 423/700; 423/709; 423/716; 423/718; 423/DIG. 22; 502/77
(58) Field of Search .................. 423/700, 709, 423/716, 718, DIG. 22, 717; 502/77, 60

(56) References Cited

U.S. PATENT DOCUMENTS

| | | |
|---|---|---|
| 3,094,383 | 6/1963 | Dzierzanowski et al. . |
| 3,119,659 | 1/1964 | Taggart et al. . |
| 3,119,660 | 1/1964 | Howell et al. . |
| 3,702,886 | 11/1972 | Argauer et al. . |
| 3,773,690 | 11/1973 | Heinze et al. . |
| 3,777,006 | 12/1973 | Rondell et al. . |
| 4,058,586 | 11/1977 | Chi et al. . |
| 4,076,842 | 2/1978 | Plank et al. . |
| 4,235,753 | 11/1980 | Brown et al. . |
| 4,275,047 * | 6/1981 | Whittam ...................... 423/DIG. 22 |
| 4,296,083 | 10/1981 | Rollmann . |
| 4,424,144 | 1/1984 | Pryor et al. ............................ 502/68 |
| 4,490,342 | 12/1984 | Valyosik . |
| 4,522,705 | 6/1985 | Chu et al. . |
| 4,560,542 | 12/1985 | Robson . |
| 4,977,120 | 12/1990 | Sakurada et al. ...................... 502/64 |
| 5,053,373 | 10/1991 | Zones ..................................... 502/64 |
| 5,102,644 * | 4/1992 | Plank et al. . |
| 5,240,892 | 8/1993 | Klocke .................................. 502/77 |
| 5,558,851 * | 9/1996 | Miller .................................. 423/702 |
| 6,004,527 * | 12/1999 | Murrell et al. ....................... 423/712 |
| 6,022,519 * | 2/2000 | Shimizu et al. ..................... 423/700 |

FOREIGN PATENT DOCUMENTS

| | | |
|---|---|---|
| 0284206B1 | 2/1992 | (EP) . |
| 0156595B1 | 12/1992 | (EP) . |
| 2160517A | 12/1985 | (GB) . |
| 92/12928 | 8/1992 | (WO) . |

* cited by examiner

*Primary Examiner*—David R. Sample
(74) *Attorney, Agent, or Firm*—Penny L. Prater; Richard J. Sheridan; Timothy J. Hadlock

(57) ABSTRACT

The invention includes a method for preparing a crystalline zeolite having the X-ray diffraction lines of Table 1. The method includes preparing a template-free reaction mixture including at least one active source of a first oxide selected from the group consisting of an oxide of silicon, germanium or both, optionally at least one active source of a second oxide selected from the group consisting of an oxide of aluminum, boron, gallium, iron or a mixture thereof; and heating the reaction mixture at crystallization conditions for sufficient time to form a crystallized material containing zeolite crystals having the X-ray diffraction lines of Table 1, where said zeolite crystals have a first oxide/second oxide molar ratio greater than 12.

19 Claims, No Drawings

METHOD FOR MAKING ZSM-5 ZEOLITES

I. FIELD OF THE INVENTION

The present invention relates to a process for making crystalline zeolites.

II. BACKGROUND OF THE INVENTION

A. Introduction

Molecular sieves are a commercially important class of crystalline materials. They have distinct crystal structures with ordered pore structures which are demonstrated by distinct X-ray diffraction patterns. The crystal structure defines cavities and pores which are characteristic of the different species. Natural and synthetic crystalline molecular sieves are useful as catalysts and adsorbents. The adsorptive and catalytic properties of each molecular sieve are determined in part by the dimensions of its pores and cavities. Thus, the utility of a particular molecular sieve in a particular application depends at least partly on its crystal structure. Because of their unique sieving characteristics, as well as their catalytic properties, molecular sieves are especially useful in such applications as gas drying and separation and hydrocarbon conversion. The term "molecular sieve" refers to a material prepared according to the present invention as a fixed, open-network structure, usually crystalline, that may be used to separate hydrocarbons or other mixtures by selective occlusion of one or more of the constituents, or may be used as a catalyst in a catalytic conversion process.

B. Problems with Use of Templates

Prior art methods of preparing crystalline zeolites require a structure-directing agent or template (see, e.g., U.S. Pat. Nos. 4,076,842; 4,296,083 and 4,490,342, regarding Zeolite ZSM-23 and U.S. Pat. No. 5,053,373, regarding Zeolite SSZ-32). Such templates add to the expense and complexity of the process. Templates are typically relatively expensive organic compounds and thus increase the expense of reactants for the process. After crystallization of the zeolites, it is necessary to remove the templates from the interior of the crystals since they would otherwise block the pores. This is accomplished by heating and thus adds additional processing complexity and expense to the process. There are also environmental risks associated with the use of the organic templates.

C. Problems with Excess Water in Reaction Mixtures

Prior art methods of preparing crystalline zeolites typically produce finely divided crystals which must be separated from an excess of liquid in which the zeolite is crystallized. The liquid, in turn, must be treated for reuse or else be discarded, with potentially deleterious environmental consequences. Preparing commercially useful catalytic materials which contain the powdered zeolite also normally requires additional binding and forming steps. Typically, the zeolite powder as crystallized must be mixed with a binder material and then formed into shaped particles or agglomerates, using methods such as extruding, agglomeration, spray drying, and the like. These binding and forming steps greatly increase the complexity of catalyst manufacture involving zeolitic materials. The additional steps may also have an adverse effect on the catalytic performance of the zeolite so bound and formed.

D. Known Methods for Zeolites Having a Molar $SiO_2/Al_2O_3$ Ratio Below 12

Prior art methods of preparing crystalline zeolites typically produce finely divided crystals which must be separated from an excess of liquid in which the zeolite is crystallized. The liquid, in turn, must be treated for reuse or else be discarded, with potentially deleterious environmental consequences. Preparing commercially useful catalytic materials which contain the powdered zeolite also normally requires additional binding and forming steps. Typically, the zeolite powder as crystallized must be mixed with a binder material and then formed into shaped particles or agglomerates, using methods such as extruding, agglomeration, spray drying, and the like. These binding and forming steps greatly increase the complexity of catalyst manufacture involving zeolitic materials. The additional steps may also have an adverse effect on the catalytic performance of the zeolite so bound and formed.

Crystalline zeolites may be divided into two general types based on crystal structure considerations. One type includes zeolites having a $SiO_2/Al_2O_3$ molar ratio in the crystalline lattice typically less than 12, which are conventionally prepared without an organic templating agent. Many of these zeolites also contain sodalite substructures, and have a tetrahedral atom density of less than about 15 $TO_2/1000$ [Angstrom]$^3$. Zeolites having these general characteristics include, for example, zeolites A, N-A, ZK-4, faujasite, X, Y, ZK-5 and rho.

A number of processes have been offered for preparing crystalline zeolites of this type within discrete particles. For example, Howell et al., in U.S. Pat. No. 3,119,660, teaches a method for producing crystalline metal aluminosilicate zeolite by reacting preformed bodies of clay particles in an aqueous reactant mixture including alkali metal oxide. Similar processes for preparing zeolites from formed bodies, which may contain zeolitic seed crystals, in alkali solutions are also taught in U.S. Pat. No. 4,424,144 to Pryor et al.; U.S. Pat. No. 4,235,753 to Brown et al.; U.S. Pat. No. 3,777,006 to Rundell et al.; U.S. Pat. No. 3,119,659 to Taggart et al.; U.S. Pat. No. 3,773,690 to Heinze et al.; U.S. Pat. No. 4,977,120 to Sakurada et al.; and GB 2 160 517 A. U.S. Pat. No. 3,094,383 teaches a method of forming an A type zeolite by aging a homogeneous reaction mixture out of contact with an external aqueous liquid phase but under conditions to prevent the dehydration of the mixture. GB 1 567 856 discloses a method of preparing zeolite A by heating an extruded mixture of metakaolin powder and sodium hydroxide.

In U.S. Pat. No. 4,058,586, Chi et al. disclose a method for crystallizing zeolites within formed particles containing added powdered zeolite, where the formed particles furnish all of the liquid needed for crystallization. Crystallizing the particles in an aqueous alkaline solution is not required using the process of Chi et al.

Verduijn, in WO 92/12928, teaches a method of preparing binder-free zeolite aggregates by aging silica-bound extruded zeolites in an aqueous ionic solution containing hydroxy ions. According to the disclosure of Verduijn, the presence of zeolite crystals in the extrudate is critical for making strong crystalline zeolite extrudates. Verduijn et al., in EPO A1/0,284,206, describe a method of preparing binderless zeolite L by forming silica and preferably 10–50 wt. % preformed zeolite L crystallites into particles, and then reacting the particles with an alkaline solution containing a source of alumina to form the zeolite L.

E. Known Methods for Zeolites Having a Molar $SiO_2/Al_2O_3$ Ratio Above 12

More recently, similar methods have been proposed for preparing high silica zeolitic materials. Conventional methods for preparing high silica materials, having a $SiO_2/Al_2O_3$ molar ratio of greater than about 10, and more typically greater than about 20, typically involves crystallizing the zeolites from aqueous solution. For example, U.S. Pat. No. 3,702,886 to Argauer et al. teaches a method of preparing ZSM-5 from a solution containing tetrapropyl ammonium hydroxide, sodium oxide, an oxide of aluminum or gallium, an oxide of silica or germanium, and water. The digestion of the gel particles is carried out until crystals form. The crystals are separated from the liquid and recovered.

A variation of the preparation procedure involves using clay as a source of alumina in preparing high silica zeolites. For example, U.S. Pat. No. 4,091,007 discloses a method for preparing a crystalline aluminosilicate zeolite, specifically ZSM-4 or ZSM-5,from a reaction mixture where at least about 70 weight percent of the alumina is provided by an alumina-containing clay added to the reaction mixture. EPO A2/0,156,595 discloses the preparation of crystalline zeolites having a silica to alumina mole ratio greater than 12 and a Constraint Index of 1 to 12 by forming a mixture of seed crystals, a source of silica, a source of alumina and water into shaped particles, which are then crystallized in an aqueous reaction mixture containing a source of alkali cations. It is also taught that alumina-containing clay may be used as an alumina source. U.S. Pat. No. 4,522,705 is directed to a catalytic cracking catalyst comprising an additive prepared by the in-situ crystallization of a clay aggregate disclosed in EPO A2/0,156,595. U.S. Pat. No. 5,145,659 teaches methods for increasing the silica content of a zeolite supported on a matrix, where the matrix may be a clay.

Special methods for preparing the reaction mixture from which a zeolite may be crystallized have also been proposed. In U.S. Pat. No. 4,560,542, a dried hydrogel containing silica and alumina is contacted with a fluid medium containing an organic templating agent and maintained at specified crystallization conditions to form a crystalline aluminosilicate.

In U.S. Pat. No. 5,240,892, a reaction mixture containing at least about 30 weight percent solids content of alumina and precipitated silica is taught for preparing zeolites. The method of preparing the reaction mixture allows agitation of the mixture during crystallization, in spite of the high solids content of the mixture.

Zeolite crystallization from reaction mixtures initially containing a gel-like phase in equilibrium with an excess of liquid phase is disclosed in R. Aiello et al., "Zeolite Crystallization from Dense Systems", *Materials Engineering* 1992, Vol. 3, n. 3, pp. 407–416.

Other approaches to synthesis of crystalline zeolites have included preparing the zeolites in an essentially aqueous-free environment. These non-aqueous methods have been described, for example, in ZEOLITES, 1992, Vol. 12, Apr./May, p. 343; ZEOLITES 1990, Vol. 10, Nov./Dec., p. 753; ZEOLITES 1989, Vol. 9, November, p. 468; Nature, Vol. 317(12), September 1985, p. 157; and J. Chem. Soc., Chem. Commun., 1988, p. 1486. J. Chem. Soc., Chem. Commun., 1993, p. 659, describes a kneading method for synthesizing ZSM-35 in a non-aqueous system, in which the amount of liquids used to prepare a crystallization mixture is not sufficient to wet all the solid particles so that the conglomerate reactant is actually a mixture of dry powder and small doughy lumps.

F. U.S. Pat. No. 5,558,851

A method is disclosed in U.S. Pat. No. 5,558,851 (the '851 patent) for preparing a crystalline aluminosilicate zeolite from a reaction mixture containing only sufficient water so that the reaction mixture may be shaped if desired. In the method, the reaction mixture is heated at crystallization conditions and in the absence of an external liquid phase, so that excess liquid need not be removed from the crystallized material prior to drying the crystals. For zeolites having a $SiO_2/Al_2O_3$ molar ratio in the crystalline lattice greater than 12, there is no teaching of a method which does not require a template in the reaction mixture. Thus, the method of the '851 patent has the benefit of no external liquid phase to recycle or dispose, but still has the requirement for a template which can add greatly to the manufacturing expense of raw materials.

G. Zeolite ZSM-5

Zeolite ZSM-5 is a zeolite having a $SiO_2/Al_2O_3$ molar ratio in the crystalline lattice greater than 12, e.g., 20–5000. This zeolite is very useful in various hydrocarbon conversion processes, including dewaxing processes for lube oils. Zeolite ZSM-5 and the conventional preparation thereof are described in U.S. Pat. No. 3,702,886 (the '886 patent) and U.S. Pat. No. 3,770,614; and the disclosure of which, and particularly the methods of preparation and the templating agents used in the preparation, are incorporated herein by reference. The '886 patent teaches that a reaction mixture from which ZSM-5 can be suitably prepared is formed by mixing sources of silica and alumina with a templating agent, preferably tetrapropylammonium hydroxide, and sources of an alkali metal oxide, preferably sodium oxide. The teaching in the '851 patent for preparing a crystalline aluminosilicate zeolite from a reaction mixture containing only sufficient water so that the reaction mixture may be shaped if desired includes applying that method to Zeolite ZSM-5. However, for ZSM-5, there is no teaching of a method which does not require a template in the reaction mixture. Thus, for ZSM-5, the method of the '851 patent has the benefit of no external liquid phase to recycle or dispose, but still has the requirement for a template.

H. Deficiencies in Known Processes for Making ZSM-5

Some of the methods described above reduce the number of steps in crystallizing zeolites. However, for zeolites having a $SiO_2/Al_2O_3$ molar ratio in the crystalline lattice greater that 12, especially ZSM-5, none of the cited patents provide a crystallization method combining a template-free reaction mixture with the ease of forming raw materials and a minimum of water into shaped particles, and crystallizing the zeolites within the shaped particles while eliminating an external liquid crystallization phase.

It would be advantageous to have a template-free, and thus relatively inexpensive, process for producing ZSM-5 crystalline zeolites not requiring an external liquid phase. This would greatly and beneficially reduce the cost of making such zeolites since such an external liquid phase is environmentally hazardous and must be treated or disposed of after the crystallization is complete. The method and process of the instant invention provides such a process for making ZSM-5.

III. SUMMARY OF THE INVENTION

Accordingly, it is an object of the present invention to provide a method for preparing crystalline zeolites having the X-ray diffraction lines of Table 1 of this specification without a template and using a minimum of liquid for crystallization.

It is further an object of one embodiment of the present invention to provide a method for preparing crystalline zeolites having the X-ray diffraction lines of Table 1 of this specification in the form of shaped particles.

It is a further object of one embodiment of the invention to provide a method for preparing crystalline zeolites having the X-ray diffraction lines of Table 1 of this specification while minimizing an aqueous waste stream.

It is a further object of the invention to provide a method for preparing zeolites having the X-ray diffraction lines of Table 1 of this specification in the absence of added binder.

It is a further object of the invention to provide a method for preparing zeolites having the X-ray diffraction lines of Table I of this specification having a small crystallite size.

It is a further object of one embodiment of the invention to provide a method for preparing zeolites having the X-ray diffraction lines of Table 1 of this specification in commercially useful forms without any post crystallization forming steps.

It is a further object of the invention to provide a method for preparing zeolites having the X-ray diffraction lines of Table 1 of this specification at reduced raw material costs.

These and further objects and advantages, which will be apparent to those skilled in the art, are realized in accordance with the present invention, wherein a crystalline zeolite having the X-ray diffraction lines of Table 1 of this specification is prepared by a method including preparing a template-free reaction mixture including at least one active source of a first oxide selected from the group consisting of an oxide of silicon, germanium or both, optionally at least one active source of a second oxide selected from the group consisting of an oxide of aluminum, boron, gallium, iron or a mixture thereof; and heating the reaction mixture at crystallization conditions for sufficient time to form a crystallized material containing zeolite crystals having the X-ray diffraction lines of Table 1, wherein the zeolite crystals have a first oxide/second oxide molar ratio greater than 12 and where the heating occurs in the absence of an added external liquid phase and/or the reaction mixture has a molar ratio of $H_2O/SiO_2$ of less than about 8.

It is important, in preparing the reaction mixture of the present process, that the amount of water present in the reaction mixture as prepared for the crystallization step be sufficient to shape the mixture. While it is not a requirement to form the mixture into shaped particles before the mixture is subjected to crystallization conditions, it may be desired in many cases to do so. This amount of water is less than the amount of water required in conventional processes for preparing zeolites having the X-ray diffraction lines of Table 1 of this specification. Thus, during the crystallization step according to this embodiment of the present process, there is no separate liquid phase present which must be removed from the crystallized material at the end of the crystallization step by, for example, filtering or decanting, prior to drying the crystals. Also, the amount of water present in the reaction mixture is insufficient to cause the shaped reaction mixture to collapse or "melt", i.e., once the reaction mixture is formed into the desired shape containing the desired amount of water, the resulting shape is self-supporting.

Among other factors, one embodiment of the present invention is based on the discovery of a method for crystallizing zeolites having the X-ray diffraction lines of Table 1 of this specification from a reaction mixture containing only enough water to form the mixture into a desired shape, and another embodiment is based on the discovery of a method for crystallizing zeolites having the X-ray diffraction lines of Table 1 of this specification from a template-free reaction mixture and a reaction mixture containing only enough water to form the mixture into a desired shape.

IV. DETAILED DESCRIPTION OF PREFERRED EMBODIMENTS

A. Description of Zeolites

The method of making zeolites of the present invention includes a method of making zeolites having the following X-ray diffraction pattern.

TABLE 1

| Interplanar Spacing d (A) | | Relative Intensity |
|---|---|---|
| 11.1 | +/−0.3 | S |
| 10.0 | +/−0.3 | S |
| 7.4 | +/−0.2 | W |
| 7.1 | +/−0.2 | W |
| 6.3 | +/−0.2 | W |
| 6.04 | +/−0.2 | W |
| 5.56 | +/−0.1 | W |
| 5.01 | +/−0.1 | W |
| 4.60 | +/−0.08 | W |
| 4.25 | +/−0.08 | W |
| 3.85 | +/−0.07 | VS |
| 3.71 | +/−0.05 | S |
| 3.04 | +/−0.03 | W |
| 2.99 | +/−0.02 | W |
| 2.94 | +/−0.02 | W |

These values were determined by standard technique. The radiation was the K-alpha doublet of copper, and a scintillation counter spectrometer with a strip chart pen recorder was used. The peak heights, I, and the positions as a function of 2 times theta, where theta is the Bragg angle, were read from the spectrometer chart. From these, the relative intensities, $100\ I/I_o$, where $I_o$ is the intensity of the strongest line or peak, and d (obs.), the interplanar spacing in A, corresponding to the recorded lines, were calculated. In Table I, the relative intensities are given in terms of the symbols W=weak, S=strong and VS=very strong. It should be understood that this X-ray diffraction pattern is characteristic of all the species of ZSM-5 zeolites. Ion exchange of the sodium ion with cations reveals substantially the same pattern with some minor shifts in interplanar spacing and variation in relative intensity. Other minor variations can occur depending on the silicon to aluminum ratio of the particular sample, as well as if it has been subjected to thermal treatment.

Zeolites having such X-ray diffraction pattern are typically designated in the art as "ZSM-5 Zeolites".

B. Reaction Mixture

Zeolite ZSM-5 and the conventional preparation thereof are described in, e.g., U.S. Pat. Nos. 3,702,886 and 3,770,614, the disclosures of which are incorporated herein by reference in their entirety. ZSM-5 type zeolites can be suitably prepared from a substantially template-free reaction mixture containing sources of an alkali metal oxide, an oxide of aluminum, and preferably wherein the aluminum oxide source provides aluminum oxide which is in a covalently dispersed form on silica, and an oxide of silicon. The reaction mixture should have a composition in terms of mole ratios falling within the following ranges:

TABLE 2

|  | Broad | Preferred | More Preferred |
|---|---|---|---|
| $SiO_2/Al_2O_3$ | 5–200 | 20–150 | 30–100 |
| $OH^-/SiO_2$ | 0.1–0.5 | 0.1–0.4 | 0.1–0.3 |
| $M^+/SiO_2$ | 0.0–0.50 | 0.1–0.5 | 0.1–0.4 |
| $H_2O/SiO_2$ | 2–8 | 3–7 | 3–6 | wherein M is an alkali metal ion, preferably sodium or potassium, most preferably potassium.

Typical sources of aluminum oxide for the reaction mixture include aluminates, alumina, $Al(OH)_3$, and aluminum compounds, such as aluminum-coated colloids, $Al_2(SO_4)_3$, and other zeolites, with aluminates, e.g., Na aluminate, and aluminum hydroxide preferred.

Typical sources of silicon oxide include precipitated silica, silicates, silica hydrogel, silicic acid, colloidal silica, fumed silicas, tetraalkyl orthosilicates, and silicic hydroxides. Salts, particularly alkali metal halides such as sodium chloride, can be added to or formed in the reaction mixture. They are disclosed in the literature as aiding the crystallization of zeolites while preventing silica occlusion in the lattice.

The reaction mixture in the preparation of ZSM-5 is maintained at an elevated temperature until the crystals of the zeolite are formed. The temperatures during the hydrothermal crystallization step are typically maintained from about 100° C. to about 200° C., preferably from about 100° C. to about 180° C., and most preferably from about 100° C. to about 160° C. The crystallization period is typically greater than 1 day and preferably from about 2 days to about 10 days.

The hydrothermal crystallization is conducted under pressure and usually in an autoclave so that the reaction mixture is subject to autogenous pressure.

C. In-Extrudate Aspects of the Reaction Mixture

To accomplish the in-extrudate crystallization, the substantially template-free reaction mixture from which and in which the zeolite is crystallized comprises at least one active source of silica, and sufficient water to form the mixture into a desired shape. This amount of water is considerably less than that required in a conventional processes for preparing zeolites. The $H_2O/SiO_2$ molar ratio in the reaction mixture is less than about 8 and preferably from about 3 to about 6.

The amount of liquid required in the reaction mixture of the present invention, where the liquid may include aqueous and, optionally, organic liquids (i.e., excluding templates/structure-directing agents), is that amount which is needed to adequately blend the mixture. Thus, a reaction mixture is prepared by mixing water with active sources of the zeolite to form a uniform mass having preferably a heavy paste-like consistency. The active sources will be in a form which can be easily blended into a uniform mass, and may be, for example, powders, hydrated particles, or concentrated aqueous solutions. Sufficient water is added to wet all the powders during the mixing and kneading steps.

Alternatively, sufficient water is added that the powders may be kneaded into a uniform and generally homogeneous mixture which may be formed into shaped particles. It is not necessary that all of the active sources be readily soluble in water during kneading, since the water added to the active sources will be insufficient to make a fluid-like mixture. The amount of water added depends on the mixing apparatus and on the active sources employed. Those familiar with the art can readily determine, without undue experimentation, the amount of liquid required to properly mix active sources of the zeolite. For example, hydrated sources of the zeolite may require relatively less water, and dried sources may require relatively more.

The water content of the reaction mixture after blending and kneading may be further adjusted, for example, by drying or the addition of water, to facilitate forming shaped particles.

Other metallic components which may be added to the reaction mixture include, for example, titanium, chromium, germanium, gallium, iron, boron and alkali and alkaline earth metals.

Typical sources of silicon oxide ($SiO_2$) include silicates, silica hydrogel, silicic acid, colloidal silica, fumed silica, tetraalkyl orthosilicates silica hydroxides, precipitated silica and clays. Typical sources of aluminum oxide ($Al_2O_3$) when used in the reaction mixture include aluminates, alumina, and aluminum compounds such as $AlCl_3$, $Al_2(SO_4)_3$, aluminum hydroxide ($Al(OH)_3$)), kaolin clays, and other zeolites, with aluminates, e.g., Na aluminate, and aluminum hydroxide preferred. Titanium, chromium, germanium, gallium, iron, boron can be added in forms corresponding to their aluminum and silicon counterparts. Salts, particularly alkali metal halides such as sodium chloride, can be added to or formed in the reaction mixture. They are disclosed in the literature as aiding the crystallization of zeolites while preventing silica occlusion in the lattice.

The reaction mixture may also comprise one or more active sources of alkali metal oxide. Sources of lithium and sodium are preferred, with sodium most preferred. Any alkali metal compound which is not detrimental to the crystallization process are suitable here. Non-limiting examples include oxides, hydroxides, nitrates, sulfates, halogenides, oxalates, citrates and acetates. In the reaction mixture, the alkali metal/silica molar ratio is preferably in the range from zero (0) to about 0.5, and more preferably in the range from about 0.1 to about 0.4. The alkali metal compound may also contribute $OH^-$. Generally, zeolite synthesis is facilitated by the presence of $OH^-$ in the reaction mixture at a molar ratio $OH^-/SiO_2$ of about 0.1 to about 0.4, and preferably from about 0.1 to about 0.3.

In the preferred method of the present zeolite synthesis, a reaction mixture is formed containing one or more sources of alkali metal oxide, hydroxide ions, an oxide of silicon, water, and optionally, an oxide of aluminum. In general, the reaction mixture will have a pH of at least 7, and preferably between about 8 and 14.

1. Seed Crystals

The zeolites of the present process are crystallized within the reaction mixture, which comprises amorphous, non-crystalline reagents. Crystalline material (i.e., "seed" crystals) are preferably added to the mixture prior to the crystallization step, although ZSM-5 may be crystallized without the addition of seeds. Methods for enhancing the crystallization of zeolites by adding "seed" crystals are well known. The broad range of seed crystals in the reaction mixture is greater than about 0 up to about 20 wt. % or more (based on dry weight), with the preferred range at about 2–10 wt. %.

2. Forming the Shaped Particles

The In-Extrudate method may be used to make zeolite powder which can then be bound by conventional methods using conventional binding agents. One advantage of the in-extrudate feature of the present invention is that the reaction mixture may be formed into a desired shape before the crystallization step, thereby reducing the number of process steps required to prepare catalytic materials containing the zeolite prepared in the mixture. Prior to forming the reaction mixture, it may be necessary to change the liquid content of the reaction mixture, either by drying or by adding more liquid, in order to provide a formable mass which retains its shape. In general, for most shaping methods, water will generally comprise from about 30 percent to about 65 percent by weight, and preferably from about 35 percent to about 60 percent by weight of the reaction mixture.

In the preforming step, the reaction mixture is formed into shaped particles. Methods for preparing the particles are well known in the art, and include, for example, extrusion, spray drying, granulation, agglomerization and the like. The particles are preferably of a size and shape desired for the ultimate catalyst, and may be in the form of, for example, extrudates, spheres, granules, agglomerates and prills. The particles will generally have a cross sectional diameter between about 1/64 inch and about 1/2 inch, and preferably between about 1/32 inch and about 1/4 inch, i.e., the particles will be of a size to be retained on a 1/64 inch, and preferably on a 1/32 inch, screen and will pass through a 1/2 inch, and preferably through a 1/4 inch, screen.

In the in-extrudate process of the present method, the shaped particles prepared from the reaction mixture will contain sufficient water to retain a desired shape. Additional water is not required in the mixture in order to initiate or maintain crystallization within the shaped particle. Indeed, it may be preferable to remove some of the excess water from the shaped particles prior to crystallization. Conventional methods for drying wet solids can be used to dry the shaped particles, and may include, for example, drying in air or an inert gas such as nitrogen or helium at temperatures below about 200° C. and at pressures from subatmospheric to about 5 atmospheres pressure.

Naturally occurring clays, e.g., bentonite, kaolin, montmorillonite, sepiolite and attapulgite, are not required, but may be included in the shaped particles prior to crystallization to provide particles having good crush strength. Such clays can be used in the raw state as originally mined or can be initially subjected to calcination, acid treatment or chemical modification. Other reagents such as aluminas (e.g., Catapal, Versal), and which are mostly not incorporated into the zeolite structure, may also be added to improve extrudability or catalyst physical properties. Microcrystalline cellulose has also been found to improve the physical properties of the particles.

3. Zeolite Crystallization

As stated above, the liquid present in the reaction mixture (which may be in the form of shaped particles) may be a combination of aqueous and organic liquids (i.e., excluding templates/structure-directing agents) so long as the specified amount of water is present. Since the total liquid content may affect, for example, the physical strength of the shaped particles, it is preferred that the total volatiles content of the reaction mixture during crystallization be in the range of between about 30% and about 65% (w/w), and preferably between about 35% and about 60% (w/w), where the total volatiles content is the measure of total volatile liquid, including water, in the reaction mixture. It is a feature of the present process that no additional liquid beyond that required to form the shaped particles is required for zeolite crystallization within the particles.

Crystallization of the zeolite takes place in the absence of an external liquid phase, i.e., in the absence of a liquid phase separate from the reaction mixture. In general, it is not detrimental to the present process if some liquid water is present in contact with the reaction mixture or with the shaped particles during crystallization, and it can be expected that some water may be on the surface of the shaped particles during crystallization. However, it is an objective of the present invention to provide a method of crystallizing zeolite ZSM-5 in such a way as to minimize the amount of water which must be treated and/or discarded following crystallization. To that end, the present method provides a zeolite synthesis method which requires no additional water for crystallization beyond a sufficient amount of liquid required to form the particles. Indeed, under certain conditions, liquid water present during crystallization may alter the form of the shaped particles, and, in extreme circumstances, may cause the shaped particles to lose their integrity or to dissolve. Thus, the amount of liquid employed during crystallization is dictated largely by the requirements for forming shaped particles from active sources of the crystalline zeolite.

Crystallization is conducted at an elevated temperature and usually in an autoclave so that the reaction mixture is subject to autogenous pressure until the crystals of zeolite are formed. The temperatures during the hydrothermal crystallization step are typically maintained from about 100° C. to about 200° C., preferably from about 100° C. to about 180° C., and more preferably from about 100° C. to about 160° C.

It is an important feature of the present process that the crystallization of zeolites is frequently accelerated relative to conventional crystallization methods. Thus, the crystallization time required to form crystals will typically range from about 3 hours to about 10 days, and more frequently from about 10 hours to about 4 days. Under certain circumstances, crystallization times of less than 48 hours are required to prepare crystallized material of high crystallinity. In the present method, the crystallized material collected following the crystallization step will typically comprise at least about 50 weight percent crystals. Crystallized material containing at least about 80 weight percent crystals, and even at least about 90 weight percent crystals, may also be prepared using the present method.

Once the zeolite crystals have formed, the crystals preferably are washed with acidic or basic solutions, e.g., dilute $HNO_3$ or KOH in water, to remove amorphous inorganic material, especially $SiO_2$, which would otherwise block the zeolite pores. This wash is usually followed with a water wash. After the water wash, the crystals are then dried, e.g., at 90° C. to 150° C. for from 8 to 24 hours. The drying step can be performed at atmospheric or subatmospheric pressures.

D. Zeolite Crystallite Size

A benefit of some embodiments of the present process is the small crystallite size of zeolite crystals formed in the process. Typically, the zeolite crystals are less than 10 micron in diameter (i.e., median length, the longest dimension) as determined by Scanning Electron Microscopy. Since small crystals are desirable for certain catalytic applications, crystallization conditions can be tailored to produce zeolite crystals with diameters of less than 1.0 micron, preferably a median length less than 0.5 micron, more preferably less than 0.3 micron. The crystal size of the zeolite may be determined by, for example, grinding the shaped particles to separate the individual crystals. High resolution electron micrographs of the separated crystals can then be prepared, after which the average size of individual zeolite crystals can be determined by reference to calibrated length standards. An average crystal size may then be computed in various well-known ways.

For purposes of this disclosure, average crystal size will be defined as a number average. It is important to note that, for purposes of this invention, zeolite crystal size is distinguished from what some manufacturers term "zeolite particle size", the latter being the average size of all particles, including both individual crystals and polycrystalline agglomerates, in the as-produced zeolite powder.

As stated above, typically, the zeolite crystals are less than 10 micron in diameter as determined by Scanning Electron Microscopy. Since small crystals are desirable for certain catalytic applications, crystallization conditions can be tailored by, for example, reducing crystallization temperature, by increasing aluminum content in the reaction mixture, by reducing the hydroxide content in the reaction mixture, by increasing the seed concentration, and/or by reducing the water content of the reaction mixture of the shaped particles prior to crystallization, to produce preferred zeolite crystal diameters. Preferred synthesis conditions for forming crystals smaller than 1 micron are as shown in Table 4 below:

TABLE 4

| | |
|---|---|
| $SiO_2/Al_2O_3$ | 20–100 |
| $OH^-/SiO_2$ | 0.1–0.4 |
| $M^+/SiO_2$ | 0.1–0.4 |
| $H_2O/SiO_2$ | 3–6 |
| wt. % seed crystals | 0–10 |

F. Zeolite Post-Treatment

A crystallized material containing crystals of zeolite is prepared in the process as described above. The synthetic zeolite can be used as synthesized or can be thermally treated (calcined). Usually, it is desirable to remove the alkali metal cation by ion exchange and replace it with hydrogen, ammonium, or any desired metal ion. The zeolite can be leached with chelating agents, e.g., EDTA or dilute acid solutions, to increase the silica:alumina mole ratio. These methods may also include the use of $(NH_4)_2SiF_6$ or acidic ion-exchange resin treatment.

The zeolite can be used in intimate combination with hydrogenating components, such as tungsten, vanadium, molybdenum, rhenium, nickel, cobalt, chromium, manganese, or a noble metal, such as palladium or platinum, for those applications in which a hydrogenation-dehydrogenation function is desired. Typical replacing cations can include metal cations, e.g., rare earth, Group IA, Group IIA and Group VIII metals, as well as their mixtures. Of the replacing metallic cations, cations of metals such as rare earth, Mn, Ca, Mg, Zn, Ga, Cd, Pt, Pd, Ni, Co, Ti, Al, Sn, Fe and Co are particularly preferred.

The hydrogen, ammonium, and metal components can be exchanged into the zeolite. The zeolite can also be impregnated with the metals, or the metals can be physically intimately admixed with the zeolite using standard methods known to the art. And, the metals can be occluded in the crystal lattice by having the desired metals present as ions in the reaction mixture from which the zeolite is prepared.

Typical ion exchange techniques involve contacting the synthetic zeolite with a solution containing a salt of the desired replacing cation or cations. Although a wide variety of salts can be employed, chlorides and other halides, nitrates, and sulfates are particularly preferred. Representative ion exchange techniques are disclosed in a wide variety of patents including U.S. Pat. Nos. 3,140,249; 3,140,251; and 3,140,253. Ion exchange can take place either before or after the zeolite is calcined. Following contact with the salt solution of the desired replacing cation, the zeolite is typically washed with water and dried at temperatures ranging from 65° C. to about 315° C.

After washing, the zeolite can be calcined in air or inert gas at temperatures ranging from about 200° C. to 820° C. for periods of time ranging from 1 to 48 hours, or more, to produce a catalytically active product especially useful in hydrocarbon conversion processes. Regardless of the cations present in the synthesized form of the zeolite, the spatial arrangement of the atoms which form the basic crystal lattice of the zeolite remains essentially unchanged. The exchange of cations has little, if any, effect on the zeolite lattice structures.

The zeolites may be used as catalysts, without additional forming, when the shaped particles, formed from the reaction mixture described hereinbefore, are of a size and shape desired for the ultimate catalyst. Alternatively, the zeolite can be composited with other materials resistant to the temperatures and other conditions employed in organic conversion processes, using techniques such as spray drying, extrusion, and the like. Such matrix materials include active and inactive materials and synthetic or naturally occurring zeolites as well as inorganic materials such as clays, silica and metal oxides. The latter may occur naturally or may be in the form of gelatinous precipitates, sols, or gels, including mixtures of silica and metal oxides.

Use of an active material in conjunction with the synthetic zeolite, i.e., combined with it, tends to improve the conversion and selectivity of the catalyst in certain organic conversion processes. Inactive materials can suitably serve as diluents to control the amount of conversion in a given process so that products can be obtained economically without using other means for controlling the rate of reaction. Frequently, zeolite materials have been incorporated into naturally occurring clays, e.g., bentonite and kaolin. These materials, i.e., clays, oxides, etc., function, in part, as binders for the catalyst. It is desirable to provide a catalyst having good crush strength, because in petroleum refining the catalyst is often subjected to rough handling. This tends to break the catalyst down into powders which cause problems in processing.

Naturally occurring clays which can be composited with the synthetic zeolites of this invention include the montmorillonite and kaolin families, which families include the sub-bentonites and kaolins commonly known as Dixie, McNamee, Georgia and Florida clays or others in which the main mineral constituent is halloysite, kaolinite, dickite, nacrite, or anauxite. Fibrous clays such as sepiolite and attapulgite can also be used as supports. Such clays can be used in the raw state as originally mined or can be initially subjected to calcination, acid treatment or chemical modification.

In addition to the foregoing materials, the zeolite prepared by the present method can be composited with porous matrix materials and mixtures of matrix materials such as silica, alumina, titania, magnesia, silica-alumina, silica-magnesia, silica-zirconia, silica-thoria, silica-beryllia, silica-titania, titania-zirconia as well as ternary compositions such as silica-alumina-thoria, silica-alumina-zirconia, silica-alumina-magnesia and silica-magnesia-zirconia. The matrix can be in the form of a cogel.

The zeolite can also be composited with other zeolites such as synthetic and natural faujasites (e.g., X and Y), erionites, and mordenites. They can also be composited with purely synthetic zeolites such as those of the ZSM, EU, FU, and NU series. The combination of zeolites can also be composited in a porous inorganic matrix.

Zeolites prepared in the present process are useful in hydrocarbon conversion reactions. Hydrocarbon conversion reactions are chemical and catalytic processes in which carbon containing compounds are changed to different carbon containing compounds. Examples of hydrocarbon conversion reactions include catalytic dewaxing, catalytic cracking, hydrocracking, and olefin and aromatics formation reactions, including formation from oxygenates. The catalysts are useful in other petroleum refining and hydrocarbon conversion reactions such as isomerizing n-paraffins and naphthenes, polymerizing and oligomerizing olefinic or acetylinic compounds such as isobutylene and pentene-1, reforming, alkylating, isomerizing polyalkyl substituted aromatics (e.g., meta xylene), and disproportionating aromatics (e.g., toluene) to provide mixture of benzene, xylenes and higher methylbenzenes.

V. ILLUSTRATIVE EMBODIMENTS

The invention will be further clarified by the following Illustrative Embodiments, which are intended to be purely exemplary of the invention. The results are shown below.

EXAMPLE 1

To 150 grams of silica (Hi-Sil 233, a hydrated silica manufactured by PPG) was added 5 grams of ZSM-5 seeds. To this was added 10 grams of Al(OH)$_3$ (Reheis F2000, 53 wt. % Al$_2$O$_3$) plus 43 grams of a 50 wt. % aqueous solution of NaOH, and mixed for 20 minutes in a Baker-Perkins mixer. To this was added 210 grams of water, with mixing continued for another 20 minutes to form an extrudable paste. The mix was then extruded through a ¹⁄₁₂-inch die on a Carver press. Molar ratios in the extrudate were as follows:

$SiO_2/Al_2O_3=43$  $OH^-/SiO_2=0.24$  $Na^+/SiO_2=0.24$  $H_2O/SiO_2=6.6$

The extrudate was placed in a sealed Teflon bottle in a stainless steel pressure vessel and heated at autogenous pressure at 140° C. for two days. The extrudate was washed with water brought up to pH 10.5 with NaOH, dried overnight in a vacuum oven at 120° C., and calcined in air for 6 hours at 580° C. X-ray diffraction analysis showed the product to about 60% ZSM-5 with no other crystalline phases.

EXAMPLE 2

To 150 grams of Hi-Sil 233 was added 5 grams of ZSM-5 seeds. To this was added 5 grams of Reheis F2000 plus 43 grams of a 50 wt. % aqueous solution of NaOH, and mixed for 20 minutes in a Baker-Perkins mixer. To this was added 210 grams of water, with mixing continued for another 20 minutes to form an extrudable paste. The mix was then extruded through a ¹⁄₁₂-inch die on a Carver press. Molar ratios in the extrudate were as follows:

$SiO_2/Al_2O_3=86$  $OH^-/SiO_2=0.24$  $Na^+/SiO_2=0.24$  $H_2O/SiO_2=6.6$

The extrudate was placed in a sealed Teflon bottle in a stainless steel pressure vessel and heated at autogenous pressure at 140° C. for two days. The extrudate was washed with water brought up to pH 10.5 with NaOH, dried overnight in a vacuum oven at 120° C., and calcined in air for 6 hours at 580° C. The yield, based on solids in the synthesis mixture, was 65 wt. %. X-ray diffraction analysis showed the product to about 100% ZSM-5 with no other crystalline phases. The average crystal size was about 0.7 microns (by SEM).

What is claimed is:

1. A method for preparing a crystalline zeolite having the X-ray diffraction lines of Table 1, said method comprising:
   (a) preparing a template-free reaction mixture comprising at least one active source of a first oxide selected from the group consisting of an oxide of silicon, germanium or both, optionally at least one active source of a second oxide selected from the group consisting of an oxide of aluminum, boron, gallium, iron or a mixture thereof, and sufficient water to shape said mixture; and
   (b) heating said reaction mixture at crystallization conditions and in the absence of an added external liquid phase for sufficient time to form a crystallized material containing zeolite crystals having the X-ray diffraction lines of Table 1, wherein said zeolite crystals have a first oxide/second oxide molar ratio greater than 12.

2. The method of claim 1, said method further comprising, after said preparing step (a) and before said heating step (b), forming said reaction mixture into shaped particles.

3. The method of claim 1:
   (a) wherein said first oxide comprises silicon and said second oxide comprises aluminum; and
   (b) wherein the molar ratio of $SiO_2/Al_2O_3$ in the reaction mixture is greater than 50.

4. The method of claim 1, wherein said reaction mixture further comprises seeds of said crystalline zeolite.

5. The method of claim 4, wherein said seeds comprise from about 1 wt. % to about 10 wt. % of the dry weight of said reaction mixture.

6. The method of claim 4, wherein said seeds comprise from about 1 wt. % to about 5 wt. % of the dry weight of said reaction mixture.

7. The method of claim 1, wherein, in said heating step (b), said reaction mixture has a molar ratio of $H_2O/SiO_2$ of less than about 8.

8. The method of claim 7, wherein said molar ratio of $H_2O/SiO_2$ is at least about 2 and not greater than about 6.

9. The method of claim 1, wherein said zeolite crystals have a number average median length not greater than about 0.5 microns.

10. The method of claim 1, wherein said zeolite crystals have a number average median length not greater than about 0.3 microns.

11. A method for preparing a crystalline zeolite having the X-ray diffraction lines of Table 1, said method comprising:
    (a) preparing a template-free reaction mixture comprising at least one active source of a first oxide selected from the group consisting of an oxide of silicon, germanium or both, optionally at least one active source of a second oxide selected from the group consisting of an oxide of aluminum, boron, gallium, iron or a mixture thereof, and sufficient water to shape said mixture; and
    (b) heating said reaction mixture at crystallization conditions, said reaction mixture having a molar ratio of $H_2O/SiO_2$ of less than about 8, for sufficient time to form a crystallized material containing zeolite crystals having the X-ray diffraction lines of Table 1, wherein said zeolite crystals have a first oxide/second oxide molar ratio greater than 12.

12. The method of claim 11, wherein said molar ratio of $H_2O/SiO_2$ is at least about 2 and not greater than about 6.

13. The method of claim 11, said method further comprising, after said preparing step (a) and before said heating step (b), forming said reaction mixture into shaped particles.

14. The method of claim 11:
    (a) wherein said first oxide comprises silicon and said second oxide comprises aluminum; and
    (b) wherein the molar ratio of $SiO_2/Al_2O_3$ in the reaction mixture is greater than 50.

15. The method of claim 11, wherein said reaction mixture further comprises seeds of said crystalline zeolite.

16. The method of claim 15, wherein said seeds comprise from about 1 wt. % to about 10 wt. % of the dry weight of said reaction mixture.

17. The method of claim 15, wherein said seeds comprise from about 1 wt. % to about 5 wt. % of the dry weight of said reaction mixture.

18. The method of claim 11, wherein said zeolite crystals have a number average median length not greater than about 0.5 microns.

19. The method of claim 11, wherein said zeolite crystals have a number average median length not greater than about 0.3 microns.

* * * * *